United States Patent
Gu et al.

(10) Patent No.: US 12,476,333 B2
(45) Date of Patent: Nov. 18, 2025

(54) BATTERY CELL HAVING CONDUCTIVE PIECE CLOSE TO WELDING REGION

(71) Applicant: CONTEMPORARY AMPEREX TECHNOLOGY (HONG KONG) LIMITED, Hong Kong (CN)

(72) Inventors: Hui Gu, Ningde (CN); Haizu Jin, Ningde (CN); Baiqing Li, Ningde (CN); Fenggang Zhao, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/639,956

(22) Filed: Apr. 18, 2024

(65) Prior Publication Data
US 2024/0266688 A1 Aug. 8, 2024

Related U.S. Application Data

(63) Continuation of application No. PCT/CN2022/094460, filed on May 23, 2022.

(51) Int. Cl.
*H01M 50/533* (2021.01)
*H01M 50/107* (2021.01)
*H01M 50/152* (2021.01)
*H01M 50/169* (2021.01)

(52) U.S. Cl.
CPC ....... *H01M 50/533* (2021.01); *H01M 50/107* (2021.01); *H01M 50/152* (2021.01); *H01M 50/169* (2021.01)

(58) Field of Classification Search
CPC ............ H01M 50/533; H01M 50/107; H01M 50/152; H01M 50/169
See application file for complete search history.

(56) References Cited

FOREIGN PATENT DOCUMENTS

| CN | 105723542 A | * | 6/2016 | ........... B23K 26/206 |
|----|-------------|---|--------|-------------------------|
| CN | 114122635 A | * | 3/2022 | |
| CN | 216085065 U | * | 3/2022 | ........ H01M 10/0525 |
| CN | 216085238 U | | 3/2022 | |
| CN | 114628866 A | * | 6/2022 | |
| JP | 2020129482 A | | 8/2020 | |

(Continued)

OTHER PUBLICATIONS

WO 2022149392 English Translation (Year: 2022).*
(Continued)

*Primary Examiner* — Jimmy Vo
(74) *Attorney, Agent, or Firm* — ANOVA LAW GROUP, PLLC

(57) ABSTRACT

A battery cell includes: a housing, wherein an opening is provided at an end portion of the housing; an electrode assembly arranged inside the housing, the electrode assembly including an electrode body and a first tab, the first tab being leaded from one end of the electrode body; an end cap closing the opening, the outer periphery of the end cap being fixed to the housing by welding; and a conductive piece located between the electrode assembly and the end cap, the conductive piece being electrically connected to the first tab, the conductive piece being electrically connected to at least one of the end cap and the housing, and an outer edge of the conductive piece extending at a position close to a welding region.

20 Claims, 7 Drawing Sheets

(56) References Cited

FOREIGN PATENT DOCUMENTS

WO 2022067778 A1 4/2022

OTHER PUBLICATIONS

CN 114122635 English Translation (Year: 2022).*
CN 216085065 English Translation (Year: 2022).*
CN 105723542 English Translation (Year: 2016).*
The World Intellectual Property Organization (WIPO) International Search Report and Written Opinion for PCT/CN2022/094460 Jan. 10, 2023 11 Pages (including translation).

* cited by examiner

BATTERY CELL HAVING CONDUCTIVE PIECE CLOSE TO WELDING REGION

CROSS-REFERENCE TO RELATED APPLICATION

This application is a continuation of International Application No. PCT/CN2022/094460, filed on May 23, 2022, the entire content of which is incorporated herein by reference.

TECHNICAL FIELD

The present application relates to the technical field of batteries, and more particularly to a battery cell, a method for manufacturing the battery cell, a battery, and a power consuming device.

BACKGROUND ART

Thanks to the advantages such as high energy density, high power density, numerous cycle uses, and long storage time, batteries such as lithium-ion batteries have been widely applied in electric vehicles.

However, how to enhance the performance and safety of batteries of the electric vehicles in use has been always a problem in the industry.

SUMMARY

An objective of the present application is to improve the performance and safety of batteries in use.

According to a first aspect of the present application, a battery cell is provided, including:
- a housing, wherein an opening is provided at an end portion of the housing;
- an electrode assembly arranged inside the housing, the electrode assembly including an electrode body and a first tab, the first tab being leaded from one end of the electrode body;
- an end cap closing the opening, the outer periphery of the end cap being fixed to the housing by welding; and
- a conductive piece located between the electrode assembly and the end cap, the conductive piece being electrically connected to the first tab, the conductive piece being electrically connected to at least one of the end cap and the housing, and an outer edge of the conductive piece extending at a position close to a welding region.

In this embodiment, the outer edge of the conductive piece extends at the position close to the welding region between the end cap and the housing, thus enabling the conductive piece to be molten-welded to the at least one of the end cap and the housing by using the heat from welding when welding the end cap to the opening of the housing, to provide a connecting interface in a single piece after cooling and solidifying, such that the conductive piece is electrically connected to the at least one of the end cap and the housing to form a conducting loop. In this way, an additional step of welding the conductive piece to the end cap is omitted, thus simplifying the process. Furthermore, compared to penetration welding of the end cap and the conductive piece from outside, residual heat during welding of the end cap and the housing is indirectly used for molten welding of the conductive piece, thus reducing energy for welding. Even if the conductive piece and the end cap or the housing are made of different metal materials, there is no obvious molten metal liquid on a contact surface between the conductive piece and the end cap or the housing. Instead, high temperatures make the atoms of a top metal layer dissolve in each other to form a conductive cross section, which is similar to the laser conduction welding and can reduce micro-cracks to prevent electrolyte leakage and in turn improve the performance and safety of the battery cell during use.

In some embodiments, a distance between the outer edge of the conductive piece and the welding region is not greater than 15 mm.

In this embodiment, the outer edge of the conductive piece is at a short distance from the welding region, and it is possible to reliably perform the molten welding of the conductive piece and at least one of the end cap and the housing by using the heat from welding, so as to electrically connect the conductive piece to at least one of the end cap and the housing to form a conducting loop reliably, thereby improving the electrical conductivity of the battery cell.

In some embodiments, the first tab is a negative tab.

In this embodiment, considering the fact that the negative tab and the end cap are made of different materials, there may be cracks on a surface of the end cap when the penetration welding is performed on the end cap from outside, the residual heat during welding of the end cap and the housing is indirectly used for molten welding of the conductive piece, reducing the energy for welding. Even if the conductive piece and the end cap or the housing are made of different metal materials, less molten metal liquid is generated on a contact surface between the conductive piece and the end cap or the housing. Instead, high temperatures make the atoms of a top metal layer dissolve in each other to form a conductive cross section, which can reduce micro-cracks to prevent electrolyte leakage and in turn improve the performance and safety of the battery cell during use.

In some embodiments, the outer edge of the conductive piece and the end cap form a recess-protrusion fit structure.

In this embodiment, the outer edge of the conductive piece and the end cap form the recess-protrusion fit structure, which can position the conductive piece and hold the conductive piece in a proper position during welding of the end cap and the housing, so as to reliably weld the conductive piece. In addition, it is possible to increase the number of welding interfaces between the conductive piece and the end cap or the housing. The plurality of welding interfaces are close to the welding region between the end cap and the housing, thereby improving the reliability of the electrical connection between the conductive piece and the end cap or the housing.

In some embodiments, the conductive piece includes:
- a main body portion electrically connected to the first tab; and
- a folded portion connected to an edge of the main body portion and extending toward the end cap;
- wherein a recess is provided in a region, close to the edge, of the inner surface of the end cap, and the folded portion extends into the recess.

In this embodiment, since the recess is provided in the end cap, the local thickness of the end cap can be reduced to allow the folded portion to be closer to the welding region between the end cap and the housing. Accordingly, with a certain welding power, it is possible to ensure sufficient residual heat during welding of the end cap and the housing, improve the welding effect of the conductive piece and the end cap or the housing, and ensure the reliability of the electrical connection, thus improving the performance of the battery cell; or the welding power required for connection between the end cap and the housing can be reduced while ensuring the welding effect of the conductive piece.

In some embodiments, an end portion of the folded portion is in contact with a bottom wall of the recess.

In this embodiment, the end portion of the folded portion is in contact with the bottom wall of the recess, and the mating interface is closest to the welding region between the end cap and the housing, which can make full use of the residual heat during welding, improve the welding effect of the folded portion and the bottom wall, and ensure the reliability of the electrical connection, thus improving the performance of the battery cell.

In some embodiments, a guiding portion is provided at an opening of the recess and configured to guide the folded portion into the recess.

In this embodiment, the guiding portion is provided at the opening of the recess, which allows the folded portion to be smoothly mounted into the recess, such that the requirement for the accuracy of fit between the folded portion and the recess is reduced, the difficulty of assembling the end cap can be reduced, the deformation of the conductive piece during assembling is prevented, and the assembling efficiency is increased.

In some embodiments, the end surface of the main body portion away from the first tab is in contact with the inner surface of the end cap.

In this embodiment, the contact area between the conductive piece and the end cap can be increased while the electrical connection is achieved by local welding of the conductive piece and the end cap or the housing, thus improving the reliability of the electrical connection between the conductive piece and the end cap to improve the performance of the battery cell.

In some embodiments, an end of the housing close to the end cap protrudes outwards as a whole to form a step on an inner side wall of the housing, and the main body portion abuts against the step.

In this embodiment, since the main body portion abuts against the step, an edge region of the main body portion can be supported stably, and the conductive piece is more stable after being assembled, such that the conductive piece can be welded reliably by using the residual heat during welding of the end cap and the housing. Moreover, the main body portion can be prevented from deforming in a direction for the electrode assembly to prevent damages to electrode plates in the electrode body or the first tab due to the deformation of the main body portion, thereby ensuring the operating performance of the battery cell. In addition, such a structure also allows a gap between the housing and the electrode assembly to be staggered with a connecting surface between the housing and the end cap to reduce the risk of electrolyte leakage at the connecting surface between the housing and the end cap.

In some embodiments, the folded portion extends along the entire circumference of the main body portion.

In this embodiment, the folded portion extends along the entire circumference of the main body portion, which can increase the overall structural strength of the conductive piece to prevent deformation Moreover, the folded portion can be welded on the entire circumference by using the residual heat during welding of the end cap and the housing, such that the reliability of the electrical connection between the conductive piece and the housing or the end cap can be improved and the reliability of the operation of the battery cell can be ensured. In addition, the current flow capacity of the conductive piece can also be improved.

In some embodiments, the folded portion includes a plurality of folded sections, and the plurality of folded sections are spaced apart along the circumference of the main body portion.

In this embodiment, the folded portion is configured into a plurality of folded sections spaced apart, which can reduce the difficulty in folding, achieve better manufacturability, avoid an overlap between adjacent folded sections, realize the assembling smoothly even when the gap of fit between the recess and the folded portion is small, and can also ensure uniform thickness of the folded sections, thus facilitating welding by using the residual heat during welding of the end cap and the housing.

In some embodiments, the conductive piece is of a sheet structure, the folded portion and the main body portion are formed integrally, and a weakened portion is provided in a connecting region between the folded portion and the main body portion.

In this embodiment, the weakened portion is provided for facilitating bending of the folded portion, reducing an external force exerted during the bending, reducing deformation of the main body portion, and improving the reliability of the electrical connections between the main body portion and the first tab, as well as between the folded portion and the end cap or the housing.

In some embodiments, the recess is provided in an outer side wall of the end cap.

In this embodiment, the recess is easy to machine, which can reduce the requirement for the accuracy of fit between the recess and the folded portion to facilitate the assembly. The recess can also minimize the contour dimension of the end cap, such as the radial dimension of a cylindrical battery cell, thereby reducing the overall size of the battery cell.

Moreover, in view of improving the effect of the electrical connection, in a first aspect, the matching interface between the end portion of the folded portion and the recess can be closer to the welding region between the housing and the recess, which facilitates welding of the folded portion by using the residual heat during welding of the end cap and the housing. In a second aspect, the outer side wall of the folded portion is closer to the inner side wall of the housing, which is conducive to forming a welding interface between the outer side wall of the folded portion and the inner side wall of the housing by also using the residual heat during the welding to realize the electrical connection between the conductive piece and the housing. In a third aspect, a small amount of soldering fluid during welding of the end cap and the housing may flow into the gap of fit between the folded portion and the end cap or the housing, further improving the welding reliability of the conductive piece. All of the above advantages can improve the reliability of the electrical connection of the conductive piece, thereby improving the electrical conductivity of the battery cell.

In some embodiments, the outer side wall of the folded portion is in contact with the inner side wall of the housing.

In this embodiment, a welding interface is formed between the outer side wall of the folded portion and the inner side wall of the housing, and when the housing is welded to the end cap, the residual heat from welding can be used to weld the folded portion to the housing to achieve the electrical connection between the folded portion and the housing so as to reliably realize electricity conduction from the first tab to the housing, thereby improving the electrical conductivity of the battery cell.

In some embodiments, the recess is located in a region, close to the edge, of the inner surface of the end cap, an inner wall of the recess includes a first inner side wall and a first outer side wall, and the folded portion extends into the recess and is in contact with at least part of the inner wall of the recess.

In this embodiment, the recess is provided in the region close to the edge of the end cap, such that mating surfaces between the recess and the end cap and the housing are staggered, which may prevent the soldering fluid from entering the recess during welding of the end cap and the housing, and realize welding of the conductive piece and the end cap only by using the residual heat during welding of the end cap and the housing, and specifically, realize the welding of the folded portion and the recess by using the residual heat. As the conductive piece and the end cap are made of different metal materials, for example, the conductive piece is made of copper and the end cap is made of steel, liquid copper or copper alloy can be prevented from penetrating into a steel grain boundary in a weld zone, and cracks on the end cap can be avoided, such that the problem of outward permeation of the electrolyte of the battery cell after long-time use is solved, and the performance and operating reliability of the battery cell are ensured.

In some embodiments, the folded portion has a second inner side wall and a second outer side wall, the second inner side wall is in contact with the first inner side wall and/or the second outer side wall is in contact with the first outer side wall.

In this embodiment, the respective inner and/or outer side walls of the folded portion and the recess are in contact, so that the conductive piece can be positioned to improve the mounting stability of the conductive piece, and welding of the folded portion and the recess can be better realized by using the residual heat generated during welding of the end cap and the housing; and moreover, with the contact between the side walls, an interface between the folded portion and the recess that facilitates the reliable welding can be formed, which can improve the reliability of electrical connection between the conductive piece and the end cap, thereby improving the electrical conductivity of the battery cell.

In some embodiments, the battery cell is cylindrical, the main body portion is circular and has a diameter of d, where 10 mm≤d≤100 mm, and the folded portion has an extension dimension of D, where 0.2 mm≤D≤1 mm.

In some embodiments, the recess has a depth of H1, where 0.1 mm≤H1≤1.8 mm and 0≤|L+D+H−H1−h|≤0.2 mm, H is the thickness of the end cap; L is the thickness of the conductive piece, D is the extension dimension of the folded portion, and h is the distance between the step and an outer end surface of the housing, the step being formed on the inner side wall of the housing by the end of the housing close to the end cap that protrudes outwards as a whole.

In some embodiments, the end cap is circular and has a diameter of C1, and the bottom wall of the recess has a width of C2, where 10 mm≤C1≤100 mm, and 0.2 mm≤C2≤2 mm.

In some embodiments, the end of the housing close to the end cap protrudes outwards as a whole to form a step on an inner side wall of the housing, and the main body portion abuts against the step; wherein the step has a width of W, and the distance between the step and the outer end surface of the housing is h, where 0.2 mm≤W≤1.0 mm and 1 mm≤h≤10 mm.

In some embodiments, the end of the housing close to the end cap protrudes outwards as a whole to form a step on an inner side wall of the housing, and the main body portion abuts against the step; wherein the step has a width of W, and the distance between the step and the outer end surface of the housing is h, where 0.2 mm≤W≤5.0 mm and 1 mm≤h≤10 mm.

In some embodiments, the conductive piece has a thickness of L, where 0.2 mm≤L≤1.0 mm; the end cap has a thickness of H, where 0.2 mm≤H≤2.0 mm; and/or the electrode body is cylindrical and has a diameter of P, where 5 mm≤P≤97 mm.

According to a second aspect of the present application, a battery is provided, including: a case assembly and a battery cell of the foregoing embodiments, the battery cell being arranged inside the case assembly.

According to a third aspect of the present application, a power consuming device is provided, including the battery of the above-mentioned embodiment. The battery is used for supplying electric energy to the power consuming device.

According to a fourth aspect of the present application, a method for manufacturing a battery cell is provided, the method including:

a component providing step, during which a housing, an end cap, an electrode assembly and a conductive piece are provided, wherein an opening is provided at an end portion of the housing, and the electrode assembly includes an electrode body and a first tab, the first tab being leaded from one end of the electrode body;

an electrode mounting step, during which the electrode assembly is mounted in the housing and the conductive piece is electrically connected to the first tab; and an end cap mounting step, during which the opening is closed by the end cap to allow the conductive piece to be located between the electrode assembly and the end cap, and the outer periphery of the end cap is fixed to the housing by welding, wherein the welded conductive piece is electrically connected to at least one of the end cap and the housing, and an outer edge of the conductive piece extends at a position close to a welding region.

In this embodiment, the outer edge of the conductive piece extends at the position close to the welding region between the end cap and the housing, thus enabling the conductive piece to be molten-welded to the at least one of the end cap and the housing by using the heat from welding when welding the end cap to the opening of the housing, to provide a connecting interface in a single piece after cooling and solidifying, such that the conductive piece is electrically connected to the at least one of the end cap and the housing to form a conducting loop. In this way, an additional step of welding the conductive piece to the end cap is omitted, thus simplifying the process. Furthermore, compared to penetration welding of the end cap and the conductive piece from outside, residual heat during welding of the end cap and the housing is indirectly used for molten welding of the conductive piece, thus reducing energy for welding. Even if the conductive piece and the end cap or the housing are made of different metal materials, there is no obvious molten metal liquid on a contact surface between the conductive piece and the end cap or the housing. Instead, high temperatures make the atoms of a top metal layer dissolve in each other to form a conductive cross section, which is similar to the laser conduction welding and can reduce micro-cracks to prevent electrolyte leakage and in turn improve the performance and safety of the battery cell during use.

In some embodiments, the conductive piece includes: a main body portion and a folded portion, wherein the main body portion is configured to be electrically connected to the first tab, the folded portion is connected at an edge of the main body portion, and the main body portion and the folded portion are in the same plane before being mounted. The manufacturing method further includes:

bending the folded portion toward the main body portion and forming an obtuse angle between the folded portion and the main body portion such that the conductive piece is in tight fit with an inner wall of the housing during the process of being mounted into the housing.

In this embodiment, the folded portion is bent at an obtuse angle from the main body portion during assembly, and the folded portion is allowed to press against the inner wall of the housing when the conductive piece is mounted into the housing, such that the folded portion can be tightly fitted to the inner wall of the housing, which can improve the reliability of the electrical connection between the conductive piece and the housing to improve the electrical conductivity of the battery cell.

BRIEF DESCRIPTION OF THE DRAWINGS

In order to more clearly illustrate the technical solutions of the embodiments of the present application, the accompanying drawings required in the embodiments of the present application will be briefly described below. Obviously, the accompanying drawings described below are merely some embodiments of the present application, and for those of ordinary skill in the art, other accompanying drawings can be obtained from these accompanying drawings without making creative efforts.

Figure 1:
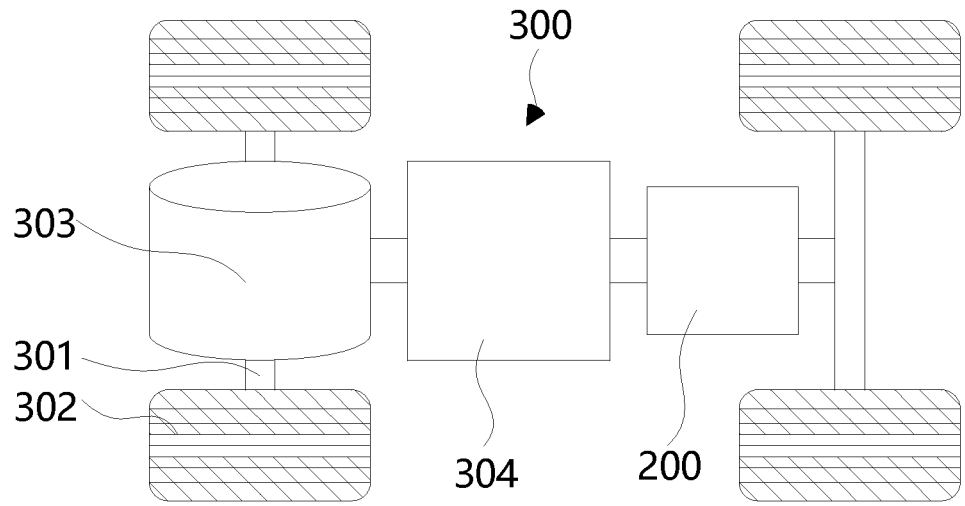
FIG. 1 is a schematic structural diagram of a battery mounted to a vehicle according to some embodiments of the present application.

In the accompanying drawings, the figures are not necessarily drawn to scale.

LIST OF REFERENCE SIGNS

100. Battery cell; 1. Housing; 11. Opening; 12. Step; 13. Mounting hole; 2. Electrode assembly; 21. Electrode body; 22. First tab; 23. Second tab; 3. End cap; 3A. First portion; 3B. Second portion; 31. Recess; 311. First inner side wall; 312. First outer side wall; 313. Bottom wall; 314. Guiding portion; 4. Conductive piece; 41. Main body portion; 42. Folded portion; 42'. Folded section; 421. Second inner side wall; 422. Second outer side wall; 43. Weakened portion; 5. Electrode terminal; 200. Battery; 201. Case assembly; 201A. Case body; 201B. Cover; 300. Vehicle; 301. Axle; 302. Wheel; 303. Motor; 304. Controller.

DETAILED DESCRIPTION OF EMBODIMENTS

The implementations of the present application will be further described in detail below in conjunction with the accompanying drawings and embodiments. The following detailed description of the embodiments and the accompanying drawings are used to illustrate the principle of the present application by way of example and are not intended to limit the scope of the present application. That is, the present application is not limited to the described embodiments.

In the description of the embodiments of the present application, the term "a plurality of" means two or more (including two), similarly the term "a plurality of groups" means two or more groups (including two groups), and the term "a plurality of pieces" means two or more pieces (including two pieces).

The present application uses the description of the orientations or positional relationships indicated by the terms "upper", "lower", "top", "bottom", "front", "rear", "inner", "outer", etc., which are merely for convenient description of the present application, rather than indicating or implying that a device referred to needs to have a particular orientation or be constructed and operated in a particular orientation, and therefore cannot be construed as limiting the scope of protection of the present application.

In addition, the terms "first", "second", "third", etc. merely for descriptive purposes, and should not be construed as indicating or implying the relative importance. The term "perpendicular" does not mean being perpendicular in the strict sense, but within an allowable range of tolerance. The term "parallel" does not mean being parallel in the strict sense, but within an allowable range of tolerance. The orientation terms in the following description all indicate directions shown in the accompanying drawings, and do not limit the specific structure in the present application.

In the description of the present application, it should also be noted that the terms "mounting", "connecting", and "connection" should be interpreted in the broad sense unless explicitly defined and limited otherwise. For example, the connection may be a fixed connection, a detachable connection, or an integral connection, or may be a direct connection, or an indirect connection by means of an intermediate medium. For those of ordinary skill in the art, the specific meanings of the terms mentioned above in the present application can be construed according to specific circumstances.

The phrase "an embodiment" mentioned herein means that the specific features, structures and characteristics described in conjunction with the embodiment may be included in at least some embodiments of the present application. The phrase at various locations in the description does not necessarily refer to the same embodiment, or an independent or alternative embodiment exclusive of another embodiment. Those skilled in the art understand explicitly or implicitly that the embodiment described herein may be combined with another embodiment.

In this disclosure, the phrases "at least one of A, B, and C" and "at least one of A, B, or C" both mean only A, only B, only C, or any combination of A, B, and C.

A battery cell may include a lithium-ion secondary battery, a lithium-ion primary battery, a lithium-sulfur battery, a sodium/lithium ion battery, a sodium-ion battery or a magnesium-ion battery, etc., which is not limited by the embodiments of the present application. The battery cell may be cylindrical, flat, cuboid or in another shape, which will also not be limited in the embodiments of the present application. The battery cells are generally classified into three types depending on the way of package: cylindrical battery cells, prismatic battery cells and pouch battery cells, which also will not be limited in the embodiments of the present application.

An existing battery cell generally includes a housing and an electrode assembly received in the housing, and the interior of the housing is filled with an electrolyte. The electrode assembly is formed mainly by stacking or winding a first battery cell and a second battery cell that have opposite polarities, and a separator is generally arranged between the first battery cell and the second battery cell. The portions of the first battery cell and the second battery cell that are coated with an active material form a main body portion of the electrode assembly, and the portions of the first battery cell and the second battery cell that are not coated with an active material respectively form a first tab and a second tab. In a lithium-ion battery, the first battery cell may be a positive battery cell, which includes a positive current collector and positive coatings arranged on two sides of the positive current collector, wherein the material of the positive current collector may be, for example, aluminum, and the positive coatings may be of, for example, lithium cobalt oxide, lithium iron phosphate, ternary lithium or lithium manganate, etc.; and the second battery cell may be a negative battery cell, which includes a negative current collector and negative coatings arranged on two sides of the negative current collector, wherein the material of the negative current collector may be, for example, copper, and the negative coatings may be of, for example, graphite or silicon, etc. The first tab and the second tab may jointly be located at one end of the main body portion or respectively at two ends of the main body portion. During the charging and discharging of the battery, the positive coating and the negative coating react with the electrolyte, and the tabs are connected to the electrode terminals to form a current loop.

Existing batteries have the problem of poor safety after long-term use. The inventor has found through research that for a cylindrical battery, a positive tab is connected to an electrode terminal, and a negative tab is connected to a housing; for the negative tab, a conductive portion is generally formed by flattening or smoothening the tab after being cut, a current collector disc and the conductive portion are then welded by laser, a cover body is welded and sealed to the housing after the electrode assembly is placed in the housing, and finally, the cover is welded to the current collector disc from the outside, and a conductive path from the negative tab through the current collector disc and the cover to the housing is formed.

Generally, the negative tab and the current collector disc are made of copper and the cover is made of a steel material. When the cover is welded to the current collector disc, due to a laser penetration weld process, a welding interface region between steel and copper is prone to micro-cracking. There are two types of micro-cracks, which are mainly distributed in a weld zone and a heat-affected zone, and the battery is subject to electrolyte permeation after long-time use, resulting in a performance degradation and a safety risk.

The following are main causes for cracks in the welding interface region. 1. Steel has a coefficient of thermal expansion and thermal conductivity significantly different from that of copper. The coefficient of thermal expansion of copper is about 40% higher than that of iron, so a welding interface is subjected to a high stress during cooling and solidifying, resulting in cracks at a weld seam. 2. Due to excess incident power of laser during welding of the end cap and the conductive piece, a molten channel is formed in the end cap, and liquid copper or copper alloy has a strong permeation effect on a steel grain boundary close to the weld zone. During crystallization, the microstructure of metal is defective and micro-cracks may be created on a surface of steel, and penetration cracks are created in the heat-affected zone under the effect of a welding tensile stress.

By analyzing the causes for the defects, the inventor believes that cracks can be reduced by omitting the penetration welding of the cover and the current collector from outside. Based on this, the reliability of the electrical connection between the current collector and the cover is improved, and the problem of electrolyte leakage at the micro-cracks of the battery during use can be solved accordingly, so as to improve the performance and safety of the battery.

Based on this improvement idea, the present application aims to provide a battery cell, including a housing, an electrode assembly, an end cap, and a conductive piece. An opening is provided at an end portion of the housing; the electrode assembly is arranged inside the housing, and the electrode assembly includes an electrode body and a first tab, the first tab being leaded from one end of the electrode body; the end cap closes the opening, and the outer periphery of the end cap is fixed to the housing by welding; and the conductive piece is located between the electrode assembly and the end cap, the conductive piece is electrically connected to the first tab, the conductive piece is electrically connected to at least one of the end cap and the housing, and an outer edge of the conductive piece extends at a position close to a welding region.

The battery cell in the embodiments of the present application is applicable to a battery and a power consuming device using the battery.

The power consuming device may be, for example, a mobile phone, a portable apparatus, a laptop, an electric motorcycle, an electric vehicle, a ship, a spacecraft, an electric toy, or an electric tool. For example, the spacecraft includes an airplane, a rocket, a space shuttle, or a spaceship. The electric toy includes a fixed or mobile electric toy, such as a game console, an electric vehicle toy, an electric ship toy, and an electric airplane toy. The electric tool includes an electric tool for metal cutting, an electric tool for grinding, an electric tool for assembling and an electric tool for railways, such as an electric drill, an electric grinder, an electric wrench, an electric screwdriver, an electric hammer, an electric impact drill, a concrete vibrator, and an electric planer.

As shown in FIG. 1, the power consuming device may be a vehicle 300, for example, a new energy vehicle. The new energy vehicle may be a battery electric vehicle, a hybrid electric vehicle, an extended-range electric vehicle, or the like; alternatively, the power consuming device may also be an unmanned aerial vehicle, a ship, or the like. Specifically, the vehicle 300 may include an axle 301, wheels 302 connected to the axle 301, a motor 303, a controller 304 and a battery 200, wherein the motor 303 is configured for driving the axle 301 to rotate, the controller 304 is configured for controlling operation of the motor 303, and the battery 200 may be arranged at the bottom, head, or tail of the vehicle 300, and configured for providing electric energy for operations of the motor 303 and other components in the vehicle.

Figure 2:
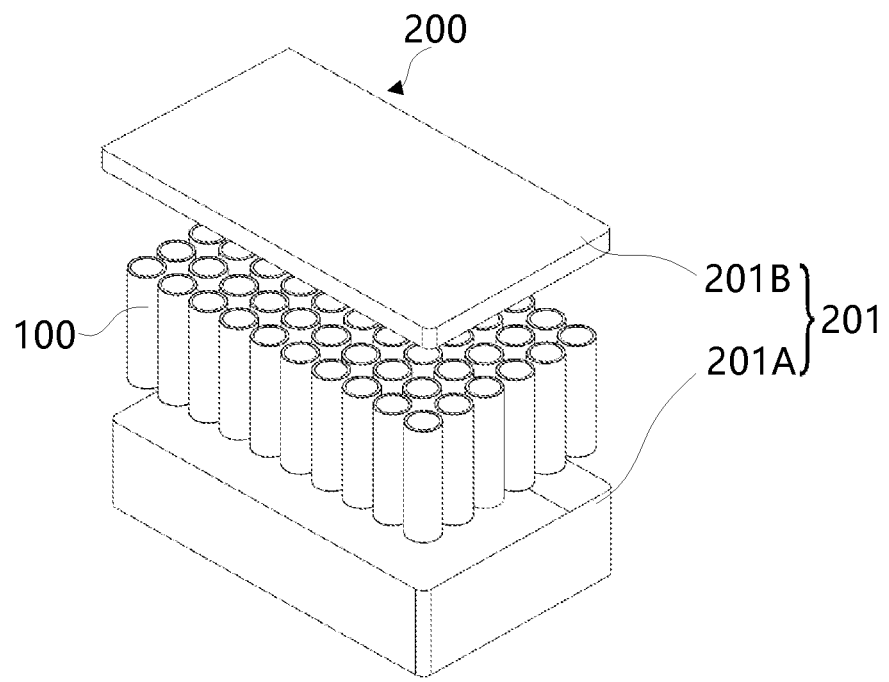
FIG. 2 is an exploded view of a battery according to some embodiments of the present application.

As shown in FIG. 2, the battery 200 includes a case assembly 201 and battery cells 100. In the battery 200, one or more battery cells 100 may be provided. If a plurality of battery cells 100 are provided, the plurality of battery cells 100 may be in series connection, in parallel connection or in series-parallel connection, and the series-parallel connection refers to that the plurality of battery cells 100 are in series and parallel connection. It is possible that the plurality of battery cells 100 to be firstly connected in series or in parallel or in series and parallel to form a battery module, and then a plurality of battery modules are connected in series or in parallel or in series and parallel to form a unit and are accommodated inside the case assembly 201. It is also possible that all the battery cells 100 are directly connected in series, or in parallel, or in series-parallel, and a unit composed of all the battery cells 100 is then accommodated inside the case assembly 201. The battery cells 100 each may be a cylinder or a cuboid.

The case assembly 201 has a hollow structure inside. For example, the case assembly 201 may include a case body 201A and a cover body 201B. The case body 201A and the cover body 201B are fitted together. For example, the case body 201A and the cover body 201B each may be a hollow cuboid and has only one side with an opening, the opening of the case body 201A and the opening of the cover body 201B are arranged opposite each other, and the case body 201A and the cover body 201B are fitted to each other to form a case having a closed cavity. It is also possible that the case body 201A is a cuboid having an opening and the cover body 201B is plate-shaped, or that the cover body 201B is a cuboid having an opening and the case body 201A is plate-shaped, and the case body 201A and the cover body 201B are arranged opposite each other and are fitted together to form the case assembly 201 having a closed cavity. At least one of the plurality of battery cells 100 are in parallel connection, in series connection or in series-parallel connection, and are placed inside the closed cavity formed by fit between the case body 201A and the cover body 201B.

The battery cell 100 may include, for example, a lithium-ion secondary battery, a lithium-ion primary battery, a lithium-sulfur battery, a sodium/lithium ion battery, or a magnesium-ion battery, etc.

Figure 3:
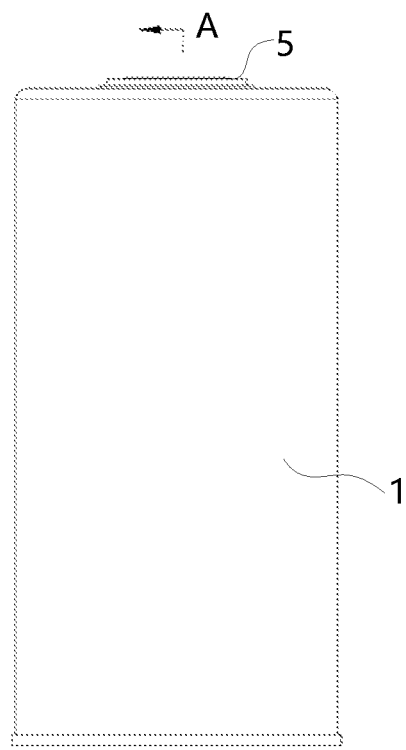
FIG. 3 is a front view of a battery cell according to a first embodiment of the present application.
Figure 4:
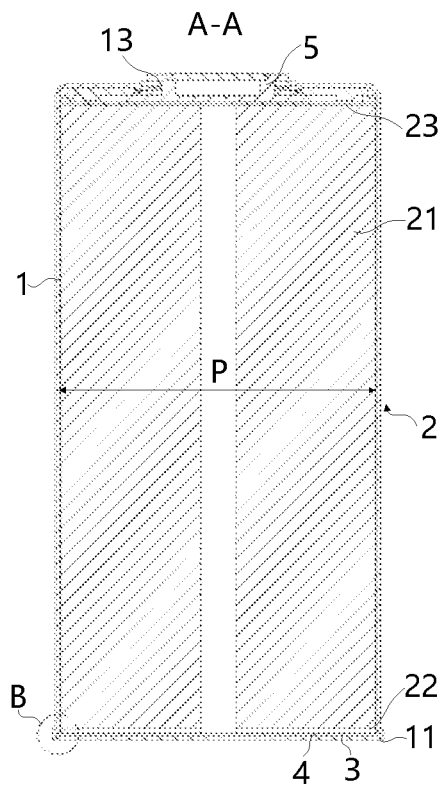
FIG. 4 is a cross-sectional view along line A-A of the battery cell shown in FIG. 3.

In some embodiments, FIGS. 3 and 4 show schematic structural diagrams of a cylindrical battery cell 100. The battery cell 100 includes: a housing 1, an electrode assembly 2, an end cap 3, and a conductive piece 4. An opening 11 is provided at an end portion of the housing 1. The electrode assembly 2 is arranged inside the housing 1, and the electrode assembly 2 includes an electrode body 21 and a first tab 22, the first tab 22 being leaded from one end of the electrode body 21. The end cap 3 closes the opening 11, and the outer periphery of the end cap 3 is fixed to the housing 1 by welding. The conductive piece 4 is located between the electrode assembly 2 and the end cap 3, the conductive piece 4 is electrically connected to the first tab 22, the conductive piece 4 is electrically connected to at least one of the end cap 1 and the housing 3, and an outer edge of the conductive piece 4 extends at a position close to a welding region.

Herein, the housing 1 is a hollow structure for accommodating the electrode assembly 2. The housing 1 has the opening 11, and the end cap 3 is used to close the opening 11. For a cuboid battery cell 100, the housing 1 is of a cuboid structure and the end cap 3 is of a rectangular-plate structure. For a cylindrical battery cell 100, the end cap 3 is of a disc-shaped structure. The housing 1 may be provided with the opening 11 only at one end and provided with a mounting hole 13 at the other end, and an electrode terminal 5 is provided at the mounting hole 13. Alternatively, the housing 1 may be provided with an opening 11 at each end, both of the openings 11 are closed by end caps 3, and an electrode terminal 5 is provided on one of the end caps 3.

The electrode assembly 2 includes an electrode body 21, a first tab 22, and a second tab 23, and the first tab 22 and the second tab are leaded from two ends of the electrode body 21 respectively. Optionally, the first tab 22 may be a negative tab, and the second tab 23 may be a positive tab. Alternatively, the first tab 22 may be a positive tab, and the second tab 23 may be a negative tab. For example, the positive tab may be made of aluminum, and the negative tab may be made of copper. The first tab 22 may be electrically connected to the end cap 3 via the conductive piece 4. The second tab 23 may be directly electrically connected to the electrode terminal 5, or electrically connected to the electrode terminal 5 via the conductive piece. For example, the electrical connections between the first tab 22 and the conductive piece 4, as well as between the second tab 23 and the electrode terminal 5 or the conductive piece may be achieved by laser welding.

The outer periphery of the end cap 3 is fixed to the housing 1 by welding, for example, by laser welding. The conductive piece 4 may be made of a metal material. The outer edge of the conductive piece 4 extends at a position close to the welding region, such that it is possible to weld a portion of the conductive piece 4 close to the edge to at least one of the end cap 3 and the housing 1 by using the heat generated during welding of the end cap 3 and the housing 1, so as to electrically connect the conductive piece 4 to the at least one of the end cap 3 and the housing 1. For example, both the end cap 3 and the housing 1 may be made of steel.

When the conductive piece 4 is electrically connected to the end cap 3 by using the heat generated during welding of the end cap 3 and the housing 1, a conductive path from the first tab 22 through the conductive piece 4 and the end cap 3 to the housing 1 is realized. When the conductive piece 4 is electrically connected to the housing 1 by using the heat generated during welding of the end cap 3 and the housing 1, a conductive path from the first tab 22 through the conductive piece 4 to the housing 1 is realized. Optionally, when the conductive piece 4 is electrically connected to the housing 1, electricity may also be conducted between the conductive piece 4 and the end cap 3 by contact therebetween. If the conductive piece 4 is electrically connected to both of the end cap 3 and the housing 1, two conductive paths can be realized at the same time, thus achieving more reliable electrical conductivity. For the battery cell 100 in this embodiment, the housing 1 serves as another electrode terminal having an opposite polarity to the electrode terminal 5 to achieve an external electrical connection.

An assembling process for the battery cell 100 includes: flattening the first tab 22 of the electrode assembly 2 or smoothening the first tab after cutting the tab to form a conductive portion, and welding the conductive portion to the conductive piece 4 by laser; mounting the electrode assembly into the housing 1, and welding the electrode terminal 5 to the second tab 23 by laser from outside the housing 1; and mounting the end cap 3 to the opening 11 of the housing 1, welding the outer periphery of the end cap 3 to an inner wall of the housing 1 by laser for sealing, and electrically connecting the outer edge of the conductive piece 4 to at least one of the end cap 3 and the housing 1 by using the heat from laser welding.

In this embodiment, the outer edge of the conductive piece 4 extends at the position close to the welding region between the end cap 3 and the housing 1, thus enabling the conductive piece 4 to be molten-welded to the at least one of the end cap 3 and the housing 1 by using the heat from welding when welding the end cap 3 to the opening 11 of the housing 1, to provide a connecting interface in a single piece after cooling and solidifying, such that the conductive piece 4 is electrically connected to the at least one of the end cap 3 and the housing 1 to form a conducting loop. In this way, an additional step of welding the conductive piece 4 to the end cap 3 is omitted, thus simplifying the process. Furthermore, compared to penetration welding of the end cap 3 and the conductive piece 4 from outside, residual heat during welding of the end cap 3 and the housing 1 is indirectly used for molten welding of the conductive piece 4, thus reducing energy for welding. Even if the conductive piece 4 and the end cap 3 or the housing 1 are made of different metal materials, there is no obvious molten metal liquid on a contact surface between the conductive piece 4 and the end cap 3 or the housing 1. Instead, high temperatures make the atoms of a top metal layer dissolve in each other to form a conductive cross section, which is similar to the laser conduction welding and can reduce micro-cracks to prevent electrolyte leakage and in turn improve the performance and safety of the battery cell 100 during use.

In some embodiments, a distance between the outer edge of the conductive piece 4 and the welding region is not greater than 15 mm.

For the selection of this distance, it is needed to consider both the own structure of the conductive piece 4 and the assembly space, and also to allow the heat generated during welding of the end cap 3 and the housing 1 to realize reliable welding of the conductive piece 4.

In this embodiment, the outer edge of the conductive piece 4 is at short distance from the welding region to allow to reliably molten welding the conductive piece 4 to at least one of the end cap 3 and the housing 1 by using the heat from welding, such that the conductive piece 4 is electrically connected to at least one of the end cap 3 and the housing 1 to reliably form a conducting loop, thereby improving the electrical conductivity of the battery cell 100.

In some embodiments, the first tab 22 is a negative tab. The negative tab is made of copper.

In this embodiment, considering the fact that the negative tab and the end cap 3 are made of different materials, there may be cracks on a surface of the end cap 3 when the penetration welding is performed on the end cap 3 from outside, the residual heat during welding of the end cap 3 and the housing 1 is indirectly used for molten welding of the conductive piece 4, reducing the energy for welding. Even if the conductive piece 4 and the end cap 3 or the housing 1 are made of different metal materials, less molten metal liquid is generated on a contact surface between the conductive piece 4 and the end cap 3 or the housing 1. Instead, high temperatures make the atoms of a top metal layer dissolve in each other to form a conductive cross section, which can reduce micro-cracks to prevent electrolyte leakage and in turn improve the performance and safety of the battery cell 100 during use.

Figure 5:
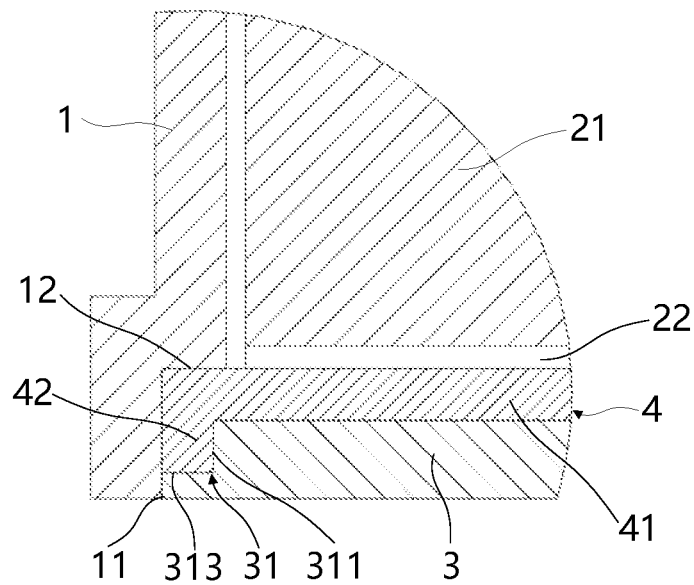
FIG. 5 is an enlarged view of part B of FIG. 4.

In some embodiments, as shown in FIG. 5, the outer edge of the conductive piece 4 and the end cap 3 form a recess-protrusion fit structure.

Herein, the recess-protrusion fit structure may extend along the entire circumference of the end cap 3, or extend along part of the circumference of the end cap 3. The recess-protrusion fit structure includes a recess 31 and a protrusion embedded in the recess 31. The recess 31 may 31 may be provided in an inner surface of the end cap 3, and the outer edge of the conductive piece 4 acts as the protrusion. Alternatively, the recess 31 may be provided in the outer edge of the conductive piece 4, and the protrusion is provided on the inner surface of the end cap 3. To allow the conductive piece 4 to be welded using the heat generated during welding of the end cap 3 and the housing 1, the recess-protrusion fit structure may be located in a region close to the inner wall of the housing 1 in a radial direction of the end cap 3.

Optionally, the conductive piece 4 may also be of an overall flat plate structure. For example, for a cylindrical battery, the conductive piece 4 is in the form of a disc, and an outer side wall of the conductive piece 4 in the radial direction may be in contact with or at a predetermined distance from an inner side wall of the housing 1.

In this embodiment, the outer edge of the conductive piece 4 and the end cap 3 form the recess-protrusion fit structure, which can position the conductive piece 4 and hold the conductive piece 4 in a proper position during welding of the end cap 3 and the housing 1, so as to reliably weld the conductive piece 4. In addition, it is possible to increase the number of welding interfaces between the conductive piece 4 and the end cap 3 or the housing 1. The plurality of welding interfaces are close to the welding region between the end cap 3 and the housing 1, thereby improving the reliability of the electrical connection between the conductive piece 4 and the end cap 3 or the housing 1.

In some embodiments, as shown in FIG. 5, the conductive piece 4 includes: a main body portion 41 and a folded portion 42. The main body portion 41 is electrically connected to the first tab 22; and the folded portion 42 is connected to an edge of the main body portion 41 and extends toward the end cap 3. A recess 31 is provided in a region, close to the edge, of the inner surface of the end cap 3, and the folded portion 42 extends into the recess 31.

The conductive piece 4 may be of a thin plate or sheet-like structure, and for a cuboid battery cell 100, the main body portion 41 may be rectangular, and the folded portion 42 may be arranged on at least one side of the main body portion 41; for a cylindrical battery cell 100, the main body portion 41 may be circular, and the folded portion 42 may be arranged on at least part of a side of the main body portion 41 along the circumference.

The main body portion 41 may be electrically connected to the first tab 22 by welding. The folded portion 42 may be connected to the outer edge of the main body portion 41 by welding, bonding or fastener connection, or may be formed integrally with the main body portion and implemented by means of bending. The recess 31 is provided in the region, close to the edge, of the inner surface of the end cap 3, such that a local thickness of the end cap 3 is reduced. The folded portion 42 acts as a protrusion of the recess-protrusion fit structure and extends into the recess 31 for the fit between the folded portion 42 and the recess 31. The folded portion 42 is in contact with the recess 31 at least some of mating surfaces to facilitate welding of the conductive piece 4.

In this embodiment, since the recess 31 is provided in the end cap 3, the local thickness of the end cap 3 can be reduced to allow the folded portion 42 to be closer to the welding region between the end cap 3 and the housing 1. Accordingly, with a certain welding power, it is possible to ensure sufficient residual heat during welding of the end cap 3 and the housing 1, improve the welding effect of the conductive piece 4 and the end cap 3 or the housing 1, and ensure the reliability of the electrical connection, thus improving the performance of the battery cell 100; or the welding power required for connection between the end cap 3 and the housing 1 can be reduced while ensuring the welding effect of the conductive piece 4.

In some embodiments, as shown in FIG. 5, an end portion of the folded portion 42 is in contact with a bottom wall 313 of the recess 31.

Herein, an end surface of the folded portion 42 away from the main body portion 41 is in contact with the bottom wall 313 of the recess 31, and both the end surface of the folded portion 42 and the bottom wall 313 of the recess 31 may be planar, which provides good contact and facilitating machining. Alternatively, the end surface of the folded portion 42 and the bottom wall 313 are in cambered or other curved surface fit.

In this embodiment, the end portion of the folded portion 42 is in contact with the bottom wall 313 of the recess 31, and the mating interface is closest to the welding region between the end cap 3 and the housing 1, which can make full use of the residual heat during welding, improve the welding effect of the folded portion 42 and the bottom wall 313, and ensure the reliability of the electrical connection, thus improving the performance of the battery cell 100.

Figure 6:
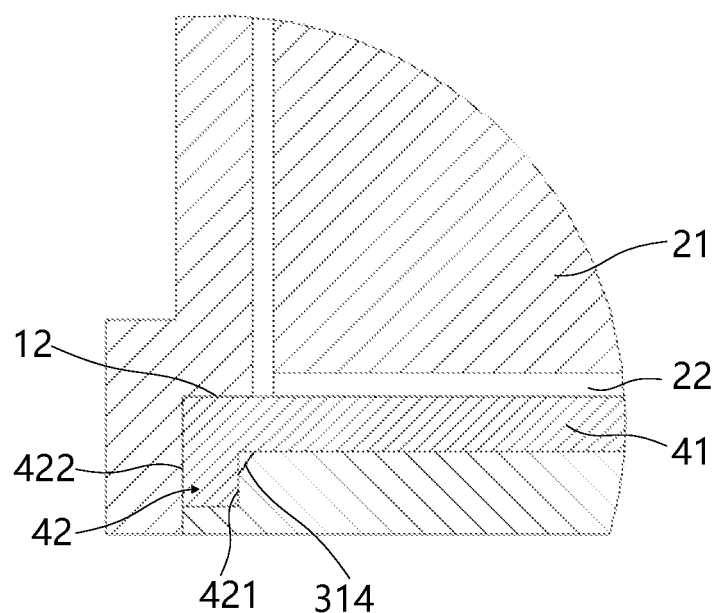
FIG. 6 is a schematic structural diagram illustrating a guiding portion provided for a recess of the battery cell shown in FIG. 4.

In some embodiments, as shown in FIG. 6, a guiding portion 314 is provided at an opening of the recess 31 and configured to guide the folded portion 42 into the recess 31.

Herein, the guiding portion 314 is configured such that the opening of the recess 31 is tapered from outside to inside, and thus smooth mounting can be achieved even when a gap for the fit between the recess 31 and the folded portion 42 is small. For example, the guiding portion 314 may include at least one guiding surface, which may be a bevel or a cambered surface or the like.

In this embodiment, the guiding portion 314 is provided at the opening of the recess 31, which allows the folded portion 42 to be smoothly mounted into the recess 31, such that the requirement for the accuracy of fit between the folded portion 42 and the recess 31 is reduced, the difficulty of assembling the end cap 3 can be reduced, the deformation of the conductive piece 4 during assembling is prevented, and the assembling efficiency is increased.

In some embodiments, the end surface of the main body portion 41 away from the first tab 22 is in contact with the inner surface of the end cap 3.

Herein, both the end surface of the main body portion 41 away from the first tab 22 and the inner surface of the end cap 3 may be planes to achieve contact over the entire surface, or both may be in partial contact.

In this embodiment, the contact area between the conductive piece 4 and the end cap 3 can be increased while the electrical connection is achieved by local welding of the conductive piece 4 and the end cap 3 or the housing 1, thus improving the reliability of the electrical connection between the conductive piece 4 and the end cap 3 to improve the performance of the battery cell 100.

Figure 7:
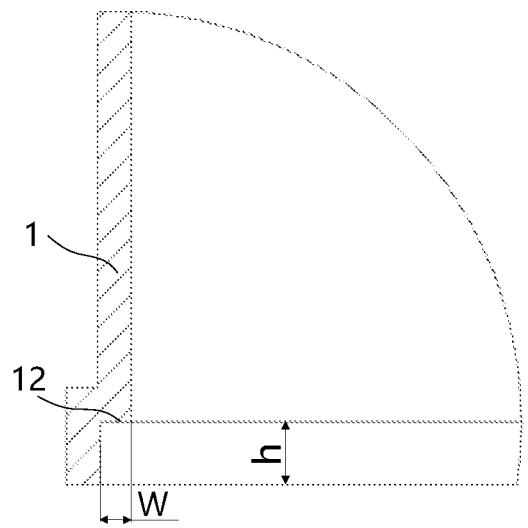
FIG. 7 is a schematic structural diagram illustrating a step provided on a housing of the battery cell shown in FIG. 4.

In some embodiments, as shown in FIG. 7, an end of the housing 1 close to the end cap 3 protrudes outwards as a whole to form a step 12 on an inner side wall of the housing 1, and the main body portion 41 abuts against the step 12.

Herein, the protrusion of the housing 1 has greater inner and outer diameters than the main body portion to ensure that the thickness of a sidewall of the housing 1 meets the strength requirements. The step 12 may be a horizontal or otherwise shaped surface, and the main body portion 41 extends toward the inner side wall of the housing 1 to overlap the step 12. For example, the battery cell 100 is cylindrical, and the end of the housing 1 close to the end cap 3 protrudes outwards as a whole in a radial direction, forming a step 12 that may be in the form of a complete ring, or a plurality of steps 12 spaced apart along the circumference.

In this embodiment, since the main body portion 41 abuts against the step 12, an edge region of the main body portion 41 can be supported stably, and the conductive piece 4 is more stable after being assembled, such that the conductive piece 4 can be welded reliably by using the residual heat during welding of the end cap 3 and the housing 1. Moreover, the main body portion 41 can be prevented from deforming in a direction for the electrode assembly 2 to prevent damages to electrode plates in the electrode body 21 or the first tab 22 due to the deformation of the main body portion 41, thereby ensuring the operating performance of the battery cell 100. In addition, such a structure also allows a gap between the housing 1 and the electrode assembly 2 to be staggered with a connecting surface between the housing 1 and the end cap 3 to reduce the risk of electrolyte leakage at the connecting surface between the housing 1 and the end cap 3.

In some embodiments, the folded portion 42 extends along the entire circumference of the main body portion 41.

For example, the battery cell 100 is cylindrical, the main body portion 41 is in the form of a disc, the folded portion 42 is in the form of a ring, and an angle between the folded portion 42 and the main body portion 41 may be a right angle, an acute angle, or an obtuse angle, depending mainly on the angles of the side walls of the recess 31.

In this embodiment, the folded portion 42 extends along the entire circumference of the main body portion 41, which can increase the overall structural strength of the conductive piece 4 to prevent deformation. Moreover, the folded portion 42 can be welded on the entire circumference by using the residual heat during welding of the end cap 3 and the housing 1, such that the reliability of the electrical connection between the conductive piece 4 and the housing 1 or the end cap 3 can be improved and the reliability of the operation of the battery cell 100 can be ensured. In addition, the overcurrent capacity of the conductive piece 4 can also be improved.

Figure 8:
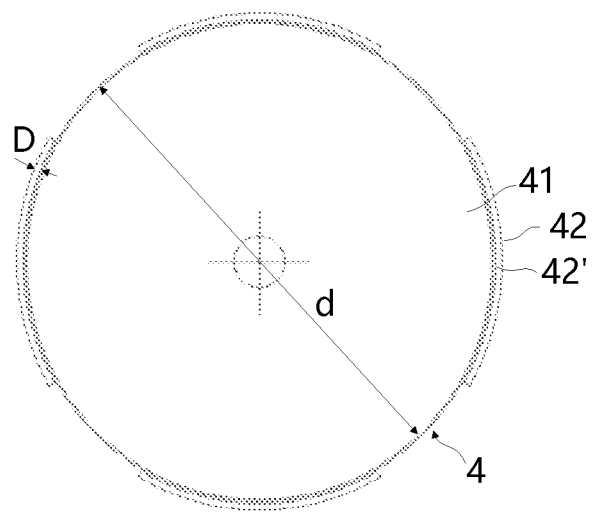
FIG. 8 is a front view of a conductive piece before being bent in the first embodiment.

In some embodiments, as shown in FIG. 8, the folded portion 42 includes a plurality of folded sections 42', and the plurality of folded sections 42' are spaced apart along the circumference of the main body portion 41.

The plurality of folded sections 42' may be spaced apart uniformly along the circumference such that uniformly distributed electrical connection regions are formed between the plurality of folded sections 42' and the housing 1 or the end cap 3. In this way, the mounting stability of the conductive piece 4 can be improved, and the conductive piece 4 can be provided with a uniform current conduction capacity along the circumference.

Optionally, if the main body portion 41 is in the form of a disc, the folded sections 42' each have an arc length of a, where $0 < a < 300$ mm, the number of the folded sections 42' is n, the angle between adjacent folded sections 42' spaced is $\alpha$, where $0 < \alpha < 360°$, satisfying $(d+2D)*\pi = a*n + n*\alpha/360°*(d+2D)*\pi$.

In this embodiment, the folded portion 42 is configured into a plurality of folded sections 42' spaced apart, which can reduce the difficulty in folding, achieve better manufacturability, avoid an overlap between adjacent folded sections 42', realize the assembling smoothly even when the gap of fit between the recess 31 and the folded portion 42 is small, and can also ensure uniform thickness of the folded sections 42', thus facilitating welding by using the residual heat during welding of the end cap 3 and the housing 1.

In some embodiments, as shown in FIGS. 9 to 12, the conductive piece 4 is of a sheet structure, the folded portion 42 and the main body portion 41 are formed integrally, and a weakened portion 43 is provided in a connecting region between the folded portion 42 and the main body portion 41.

Figure 11:
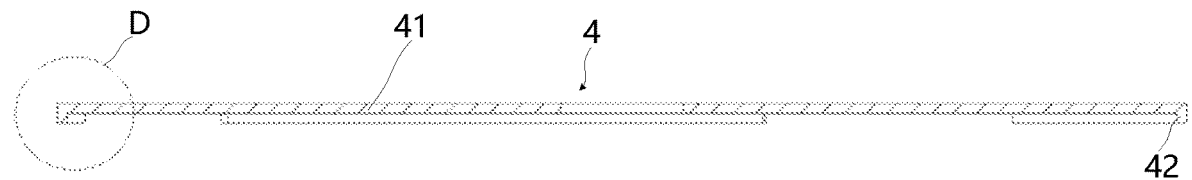
FIG. 11 is a cross-sectional view of the conductive piece that has been bent in the first embodiment.
Figure 12:
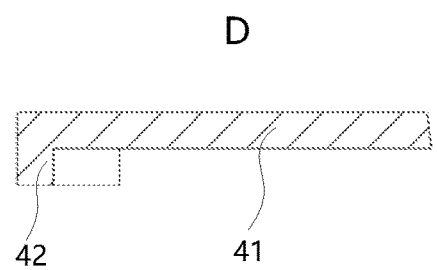
FIG. 12 is an enlarged view of part D of FIG. 11.

Herein, the folded portion 42 is in the same plane as the main body portion 41 before it is folded. The weakened portion 43 provided at the root of the folded portion 42 contributes to bending the folded portion 42 toward one side of the main body portion 41. FIG. 11 shows a schematic diagram of the conductive piece 4 that has been bent. Optionally, the weakened portion 43 may be a thickness-reduced portion. For example, the thickness-reduced portion is formed by providing an indentation, which may be provided on the inner side of the folded portion 42 in a bending direction. Alternatively, the weakened portion 43 may be realized by reducing material strength locally.

Optionally, the weakened portion 43 includes an indentation having a depth of B, where $L*30\% \leq B \leq L*90\%$, and L is the thickness of the conductive piece 4.

Optionally, the dimensional proportion occupied by the folded portion 42 in a circumferential direction of the main body portion 41 ranges from 10% to 99%.

In this embodiment, the weakened portion 43 is provided for facilitating bending of the folded portion 42, reducing an external force exerted during the bending, reducing deformation of the main body portion 41, and improving the reliability of the electrical connections between the main body portion 41 and the first tab 22, as well as between the folded portion 42 and the end cap 3 or the housing 1.

In a first embodiment, as shown in FIGS. 5 to 13, the recess 31 is provided in the outer side wall of the end cap 3.

Herein, the recess 31 includes only the bottom wall 313 and a first inner side wall 311, and the outer side wall of the recess 31 is open. During welding of the end cap 3 and the housing 1, the folded portion 42 may be welded to at least one of the bottom wall 313 and the first inner side wall 311. The end cap 3 may include a first portion 3A and a second portion 3B. The first portion 3A is superposed on the second portion 3B. The contour dimension of the first portion 3A is smaller than the contour dimension of the second portion 3B on the entire circumference. The region where the first portion 3A is retracted inwardly relative to the second portion 3B forms the recess 31. For example, if the battery cell 100 is cylindrical, the end cap 3 is in the form of a disc, the bottom wall 313 is a circular and flat surface, and the first inner side wall 311 is a cylindrical surface.

In this embodiment, the recess 31 is easy to machine, which can reduce the requirement for the accuracy of fit between the recess 31 and the folded portion 42 to facilitate the assembly. The recess 31 can also minimize the contour dimension of the end cap 3, such as the radial dimension of a cylindrical battery cell 100, thereby reducing the overall size of the battery cell 100.

Moreover, in view of improving the effect of the electrical connection, in a first aspect, the matching interface between the end portion of the folded portion 42 and the recess 31 can be closer to the welding region between the housing 1 and the recess 31, which facilitates welding of the folded portion 42 by using the residual heat during welding of the end cap 3 and the housing 1. In a second aspect, the outer side wall of the folded portion 42 is closer to the inner side wall of the housing 1, which is conducive to forming a welding interface between the outer side wall of the folded portion 42 and the inner side wall of the housing 1 by also using the residual heat during the welding to realize the electrical connection between the conductive piece 4 and the housing 1. In a third aspect, a small amount of soldering fluid during welding of the end cap 3 and the housing 1 may flow into the gap of fit between the folded portion 42 and the end cap 3 or the housing 1, further improving the welding reliability of the conductive piece 4. All of the above advantages can improve the reliability of the electrical connection of the conductive piece 4, thereby improving the electrical conductivity of the battery cell 100.

Furthermore, for an embodiment in which the end of the housing 1 close to the end cap 3 protrudes outwards as a whole in a radial direction to form the step 12, such a recess 31 allows the main body portion 41 to extend as far as possible toward the outer edge of the end cap 3, increasing the length of the overlap between the main body portion 41 and the step 12, thereby improving the mounting stability of the conductive piece 4 and reliably preventing the conductive piece 4 from being deformed to damage the electrode assembly 2.

In some embodiments, as shown in FIG. 5, the outer side wall of the folded portion 42 is in contact with the inner side wall of the housing 1.

The contact referred to herein includes a perfect fit and the presence of a small gap caused by an assembly error.

In this embodiment, a welding interface is formed between the outer side wall of the folded portion 42 and the inner side wall of the housing 1, and when the housing 1 is welded to the end cap 3, the residual heat from welding can be used to weld the folded portion 42 to the housing 1 to achieve the electrical connection between the folded portion 42 and the housing 1 so as to reliably realize electricity conduction from the first tab 22 to the housing 1, thereby improving the electrical conductivity of the battery cell 100.

In some embodiments, the battery cell 100 is cylindrical, as shown in FIG. 8, the main body portion 41 is circular and has a diameter of d, where 10 mm≤d≤100 mm, and the folded portion 42 has an extension dimension of D, where 0.2 mm≤D≤1 mm.

Figure 13:
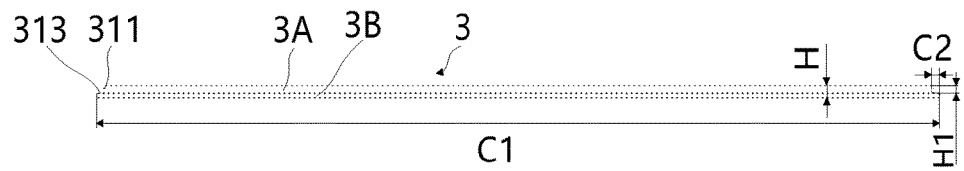
FIG. 13 is a side view of an end cap in the first embodiment of the present application.

In some embodiments, as shown in FIG. 13, the recess 31 has a depth of H1, where 0.1 mm≤H1≤1.8 mm and 0≤|L+D+H−H1−h|≤0.2 mm to meet the manufacturing requirements for assembly and welding. H is the thickness of the end cap 3; L is the thickness of the conductive piece 4, D is the extension dimension of the folded portion 42, and h is the distance between the step 12 and an outer end surface of the housing 1, the step being formed on the inner side wall of the housing 1 by the end of the housing 1 close to the end cap 3 that protrudes outwards as a whole.

In some embodiments, as shown in FIG. 13, the end cap 3 is circular and has a diameter of C1, and the bottom wall 313 of the recess 31 has a width of C2, where 10 mm≤C1≤100 mm, and 0.2 mm≤C2≤2 mm.

In some embodiments, as shown in FIG. 7, the step 12 has a width of W, and the distance between the step 12 and the outer end surface of the housing 1 is h, where 0.2 mm≤W≤1.0 mm and 1 mm≤h≤10 mm.

Figure 10:
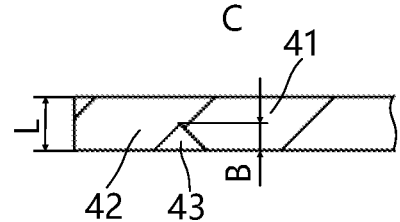
FIG. 10 is an enlarged view of part C of FIG. 9.

In some embodiments, as shown in FIGS. 10 and 13, the conductive piece 4 has a thickness of L, where 0.2 mm≤L≤1.0 mm; the end cap 3 has a thickness of H, where 0.2 mm≤H≤2.0 mm; and/or as shown in FIG. 4, the electrode body 21 is cylindrical and has a diameter of P, where 5 mm≤P≤97 mm.

Figure 14:
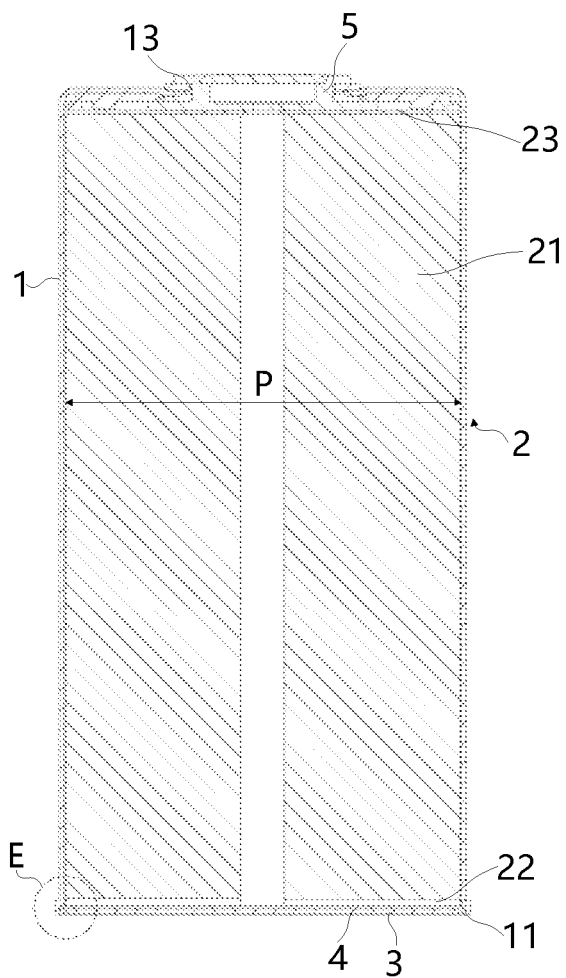
FIG. 14 is a cross sectional view of a battery cell according to a second embodiment of the present application.
Figure 15:
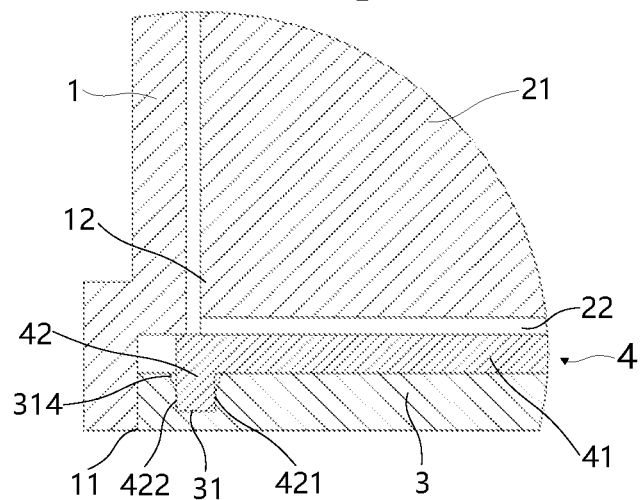
FIG. 15 is an enlarged view of part E of FIG. 14.
Figure 16:
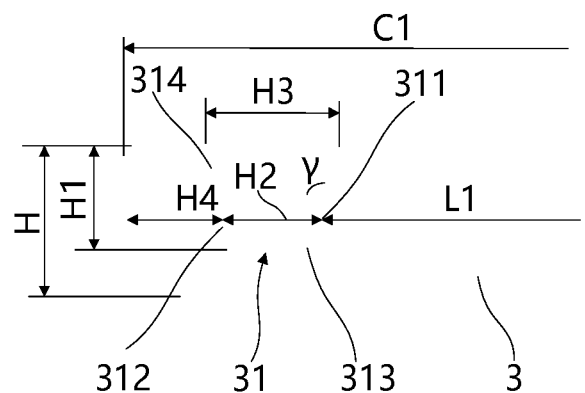
FIG. 16 is a schematic structural diagram illustrating a recess provided in an end cap shown in FIG. 14.

FIGS. 14 to 16 are schematic structural diagrams of a second embodiment. In some embodiments, as shown in FIGS. 14 and 15, the recess 31 is located in a region, close to the edge, of the inner surface of the end cap 3, an inner wall of the recess 31 includes a first inner side wall 311 and a first outer side wall 312, and the folded portion 42 extends into the recess 31 and is in contact with at least part of the inner wall of the recess 31.

Herein, the inner wall of the recess 31 includes the first inner side wall 311, the first outer side wall 312, and the bottom wall 313. The first inner side wall 311 and the first outer side wall 312 are arranged opposite each other, and the bottom wall 313 is connected between the first inner side wall 311 and the first outer side wall 312. The recess 31 may be in the form of an annular groove extending along the entire circumference, or may be configured into a plurality of segments spaced apart along the circumference. For example, if the end cap is in the form of a disc, the recess 31 is in the form of a circular groove. Since the recess 31 is located in the region close to the edge of the end cap 3, there is a predetermined spacing between the outer side wall of the folded portion 42 and the inner wall of the housing 1.

Optionally, a guiding portion 314 may be provided at the opening of the recess 31. For example, the guiding portion 314 may include guiding surfaces provided on the first inner side wall 311 and the first outer side wall 312, the two guiding surfaces being arranged at the opening of the recess 31. A distance between the two guiding surfaces gradually increases from inside to outside for guiding the folded portion 42 to be mounted into the recess 31. Alternatively, the guiding portion 314 may also include a guiding surface provided only on the first inner side wall 311 or the first outer side wall 312. For example, the guiding surface may be a bevel or a cambered surface.

In this embodiment, the recess 31 is provided in the region close to the edge of the end cap 3, such that mating surfaces between the recess 31 and the end cap 3 and the housing 1 are staggered, which may prevent the soldering fluid from entering the recess 31 during welding of the end cap 3 and the housing 1, and realize welding of the conductive piece 4 and the end cap 3 only by using the residual heat during welding of the end cap 3 and the housing 1, and specifically, realize the welding of the folded portion 42 and the recess 31 by using the residual heat. As the conductive piece 4 and the end cap 3 are made of different metal materials, for example, the conductive piece 4 is made of copper and the end cap 3 is made of steel, liquid copper or copper alloy can be prevented from penetrating into a steel grain boundary in a weld zone, and cracks on the end cap 3 can be avoided, such that the problem of outward permeation of the electrolyte of the battery cell 100 after long-time use is solved, and the performance and operating reliability of the battery cell 100 are ensured.

In some embodiments, as shown in FIG. 15, the folded portion 42 has a second inner side wall 421 and a second outer side wall 422, the second inner side wall 421 is in contact with the first inner side wall 311 and/or the second outer side wall 422 is in contact with the first outer side wall 312.

Herein, if the second inner side wall 421 is in contact with the first inner side wall 311, the folded portion 42 and the inner side wall of the recess 31 are in contact with each other. If the second outer side wall 422 is in contact with the first outer side wall 312, the folded portion 42 and the outer side wall of the recess 31 are in contact with each other. Optionally, the end surface of the folded portion 42 away from the main body portion 41 may also be in contact with the bottom wall 313 of the recess 31.

In this embodiment, the respective inner and/or outer side walls of the folded portion 42 and the recess 31 are in contact, such that the conductive piece 4 can be positioned to improve the mounting stability of the conductive piece 4, and the welding of the folded portion 42 and the recess 31 can be better realized by using the residual heat during welding of the end cap 3 and the housing 1. Moreover, with the contact between the side walls, an interface between the folded portion 42 and the recess 31 that facilitates reliable welding can be formed, which can improve the reliability of the electrical connection between the conductive piece 4 and the end cap 3, thereby improving the electrical conductivity of the battery cell 100.

In some embodiments, as shown in FIG. 14, the step 12 has a width of W, and the distance between the step 12 and the outer end surface of the housing 1 is h, where $0.2 \text{ mm} \leq W \leq 5.0 \text{ mm}$ and $1 \text{ mm} \leq h \leq 10 \text{ mm}$.

Optionally, in the second embodiment, as shown in FIG. 16, the end cap 3 has a diameter of C1, where $5 \text{ mm} \leq C1 \leq 97 \text{ mm}$. The diameter of the first inner side wall 311 is L1, the distance between the first outer side wall 312 and the edge of the end cap 3 is H4, the depth of the recess 31 is H1, satisfying $0.1 \leq H1 \leq 1.8$ mm, and the width of the bottom wall 313 of the recess 31 is H2. In order to facilitate the insertion of the folded portion 42 into the recess 31, a guiding angle satisfying $90 \leq \gamma < 180$ is provided at the opening of the recess 31. The width of the top flare is H3, and the parameter of $2*H4+2*H2+H3-H2+L1=C1$ is satisfied. In order to enable the folded portion 42 to directly face the recess 31 of the end cap 3, $d+2L=2*H2+H3-H2+L1$ is also satisfied. In order to configure the thickness of the folded portion 42 such that the folded portion is exactly inserted into the end cap 3 and to meet the requirement of the gap for laser melting of the side wall of the end cap 3 and the folded portion 42, it needs to satisfy $0 \leq |H2-L| \leq 0.05$ mm. In order to ensure the sealing interface and the appearance dimension, it needs to satisfy $0 \leq |(H1+H-H1+L)-(h-d1)| \leq 0.05$ mm. In addition, the parameters given in the first embodiment are also applicable to the second embodiment.

In this embodiment, since the recess 31 is provided in the region close to the edge of the end cap 3, the step 12 needs to extend over a large width such that the main body portion 41 of the conductive piece 4 can overlap the step 12.

The specific structure of the battery cell 100 of the present application will be described in detail below by way of an example of a cylindrical battery cell.

In the first embodiment, as shown in FIGS. 3 to 13, the battery cell 100 includes a housing 1, an electrode assembly 2, an end cap 3, and a conductive piece 4. One end of the housing 1 has an opening 11 and the other end is closed, and the closed end is provided with an electrode terminal 5. The end cap 3 closes the opening 11 and is fixed by welding, for example, laser welding may be used. The electrode assembly 2 includes an electrode body 21, a first tab 22, and a second tab 23. The first tab 22 and the second tab 23 are respectively leaded from the ends of the electrode body 21 along the winding axis, the first tab 22 is a negative tab, and the second tab 23 is a positive tab.

As shown in FIG. 5, the conductive piece 4 includes a main body portion 41 and a folded portion 42, the folded portion 42 is bent relative to the main body portion 41 toward the side away from the electrode assembly 2, and the folded portion 42 has a second inner side wall 421 and a second outer side wall 422. The end surface of the main body portion 41 facing the electrode assembly 2 is electrically connected to the first tab 22, and the end surface of the main body portion 41 facing away from the electrode assembly is fitted to an inner surface of the end cap 3. A recess 31 is provided in the inner surface of the end cap 3, and the recess 31 is located on an outer side wall of the end cap 3 such that an inner wall of the recess 31 includes only a first inner side wall 311 and a bottom wall 313. The first inner side wall 311 is fitted to the second inner side wall 421 of the folded portion 42, and the second outer side wall 422 is flush with the outer side wall of the end cap 3 that has the largest dimension.

As shown in FIG. 7, the end of the housing 1 close to the end cap 3 protrudes outwards as a whole to form a step 12 on an inner side wall of the housing 1, the main body portion 41 abuts against the step 12, and the second outer side wall 422 is fitted to the inner wall of the housing 1.

As shown in FIG. 8, the folded portion 42 includes a plurality of folded sections 42', and the plurality of folded sections 42' are spaced apart along the circumference of the main body portion 41. For example, two, three or four folded sections 42' may be provided. A through hole may be provided in the center of the main body portion 41.

Figure 9:
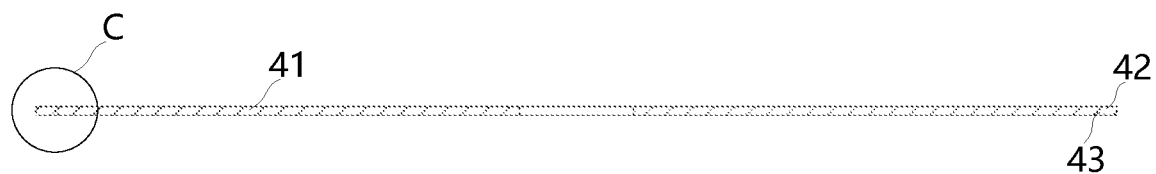
FIG. 9 is a cross-sectional view of the conductive piece before being bent.

As shown in FIG. 9, a weakened portion 43 may be provided in a region where the main body portion 41 is connected to the folded portion 42 so as to facilitate bending of the folded portion 42.

In the second embodiment, as shown in FIGS. 14 to 16, the difference from the first embodiment is that the recess 31 is provided in the region, close to the edge, of the inner surface of the end cap 3, and the inner wall of the recess 31 includes the first inner side wall 311, the first outer side wall 312, and the bottom wall 313, with the first inner side wall 311 and the first outer side wall 312 being arranged opposite each other, and the bottom wall 313 being connected between the first inner side wall 311 and the first outer side wall 312. Since the recess 31 is located in the region close to the edge of the end cap 3, there is a predetermined spacing between the outer side wall of the folded portion 42 and the inner wall of the housing 1.

Optionally, as shown in FIG. 15, a guiding portion 314 may be provided at the opening of the recess 31, the guiding portion 314 may include guiding surfaces provided on the first inner side wall 311 and the first outer side wall 312. The two guiding surfaces are located at the opening of the recess 31, and a distance between the two guiding surfaces gradually increases from inside to outside for guiding the folded portion 42 to be mounted into the recess 31. For example, the guiding surface may be a bevel or a cambered surface.

Figure 17:
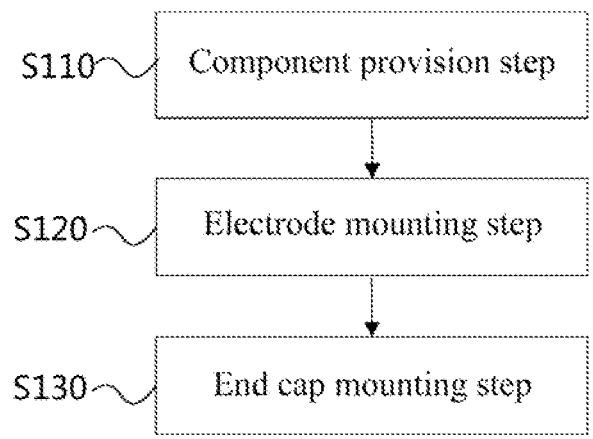
FIG. 17 is a schematic flow chart of a method for manufacturing a battery cell according to some embodiments of the present application.

Further, in some embodiments, as shown in FIG. 17, the present application provides a method for manufacturing a battery cell 100, the method including:

a component provision step S110, during which a housing 1, an end cap 3, an electrode assembly 2 and a conductive piece 4 are provided, wherein an opening 11 is provided at an end portion of the housing 1, and the electrode assembly 2 includes an electrode body 21 and a first tab 22, the first tab 22 being leaded from one end of the electrode body 21;

an electrode mounting step S120, during which the electrode assembly 2 is mounted in the housing 1 and the conductive piece 4 is electrically connected to the first tab 22; and an end cap mounting step S130, during which the opening 11 is closed by the end cap 3 to allow the conductive piece 4 to be located between the electrode assembly 2 and the end cap 3, and the outer periphery of the end cap 3 is fixed to the housing 1 by welding, wherein the welded conductive piece 4 is electrically connected to the end cap 3, and an outer edge of the conductive piece 4 extends at a position close to a welding region.

Steps S110-S130 are performed in a sequence.

In this embodiment, the outer edge of the conductive piece 4 extends at the position close to the welding region between the end cap 3 and the housing 1, thus enabling the conductive piece 4 to be molten-welded to the at least one of the end cap 3 and the housing 1 by using the heat from welding when welding the end cap 3 to the opening 11 of the housing 1, to provide a connecting interface in a single piece after cooling and solidifying, such that the conductive piece 4 is electrically connected to the at least one of the end cap 3 and the housing 1 to form a conducting loop. In this way, an additional step of welding the conductive piece 4 to the end cap 3 is omitted, thus simplifying the process. Furthermore, compared to penetration welding of the end cap 3 and the conductive piece 4 from outside, residual heat during welding of the end cap 3 and the housing 1 is indirectly used for molten welding of the conductive piece 4, thus reducing energy for welding. Even if the conductive piece 4 and the end cap 3 or the housing 1 are made of different metal materials, there is no obvious molten metal liquid on a contact surface between the conductive piece 4 and the end cap 3 or the housing 1. Instead, high temperatures make the atoms of a top metal layer dissolve in each other to form a conductive cross section, which is similar to the laser conduction welding and can reduce micro-cracks to prevent electrolyte leakage and in turn improve the performance and safety of the battery cell 100 during use.

In some embodiments, the conductive piece 4 includes: a main body portion 41 and a folded portion 42, wherein the main body portion 41 is configured to be electrically connected to the first tab 22, the folded portion 42 is connected at an edge of the main body portion 41, and the main body portion 41 and the folded portion 42 are in the same plane before being mounted. The manufacturing method further includes:

bending the folded portion 42 toward the main body portion 41 and forming an obtuse angle between the folded portion 42 and the main body portion 41 such that the conductive piece 4 is in tight fit with an inner wall of the housing 1 during the process of being mounted into the housing 1.

Herein, the angle formed between the folded portion 42 and the main body portion 41 is θ, where $90°≤θ≤120°$.

In this embodiment, the folded portion 42 is bent at an obtuse angle from the main body portion 41 during assembly, and the folded portion 42 is allowed to press against the inner wall of the housing 1 to undergo a certain pressing force when the conductive piece 4 is mounted into the housing 1, such that the folded portion 42 can be tightly fitted to the inner wall of the housing 1, which can improve the reliability of the electrical connection between the conductive piece 4 and the housing 1 to improve the electrical conductivity of the battery cell 100.

Although the present application has been described with reference to some embodiments, various modifications can be made, and equivalents can be provided to substitute for the components thereof without departing from the scope of the present application. In particular, the technical features mentioned in the embodiments can be combined in any manner, provided that there is no structural conflict. The present application is not limited to the specific embodiments disclosed herein but includes all the technical solutions that fall within the scope of the claims.

What is claimed is:

1. A battery cell, comprising:
a housing, wherein an opening is provided at an end portion of the housing;
an electrode assembly arranged inside the housing, the electrode assembly comprising an electrode body and a first tab, the first tab being leaded from one end of the electrode body;
an end cap closing the opening, the outer periphery of the end cap being fixed to the housing by welding; and
a conductive piece located between the electrode assembly and the end cap, the conductive piece being electrically connected to the first tab, the conductive piece being electrically connected to the end cap to form a conducting loop by being molten-welded to the end cap using heat from a welding process during which the end cap is welded to the housing, and an outer edge of the conductive piece being welded to the end cap at a welding interface extending at a position close to a welding region at which the end cap is welded to the housing;
wherein the end cap is in direct contact with an inner surface of the housing, the conductive piece is in direct contact with the inner surface of the housing along a first direction, and the conductive piece is in direct contact with the end cap along a second direction, the first direction being approximately perpendicular to the second direction.

2. The battery cell according to claim 1, wherein a distance between the outer edge of the conductive piece and the welding region is not greater than 15 mm.

3. The battery cell according to claim 1, wherein the outer edge of the conductive piece and the end cap form a recess-protrusion fit structure.

4. The battery cell according to claim 1, wherein:
the conductive piece comprises:
a main body portion electrically connected to the first tab; and
a folded portion connected to an edge of the main body portion and extending toward the end cap; and
a recess is provided in a region, close to the edge, of an inner surface of the end cap, and the folded portion extends into the recess.

5. The battery cell according to claim 4, wherein an end portion of the folded portion is in contact with a bottom wall of the recess.

6. The battery cell according to claim 4, wherein a guiding portion is provided at an opening of the recess and configured to guide the folded portion into the recess.

7. The battery cell according to claim 4, wherein the end surface of the main body portion away from the first tab is in contact with the inner surface of the end cap.

8. The battery cell according to claim 4, wherein the end of the housing close to the end cap protrudes outwards as a whole to form a step on an inner side wall of the housing, and the main body portion abuts against the step.

9. The battery cell according to claim 4, wherein the folded portion extends along the entire circumference of the main body portion.

10. The battery cell according to claim 4, wherein the folded portion comprises a plurality of folded sections, and the plurality of folded sections are spaced apart along the circumference of the main body portion.

11. The battery cell according to claim 4, wherein the conductive piece is of a sheet structure, the folded portion and the main body portion are formed integrally, and a weakened portion is provided in a connecting region between the folded portion and the main body portion.

12. The battery cell according to claim 4, wherein the recess is arranged in an outer side wall of the end cap, and an outer side wall of the folded portion is in contact with the inner side wall of the housing.

13. The battery cell according to claim 4, wherein the recess is located in a region, close to the edge, of the inner surface of the end cap, an inner wall of the recess comprises a first inner side wall and a first outer side wall, and the folded portion extends into the recess and is in contact with at least part of the inner wall of the recess.

14. The battery cell according to claim 13, wherein the folded portion has a second inner side wall and a second outer side wall, the second inner side wall being in contact with the first inner side wall and/or the second outer side wall being in contact with the first outer side wall.

15. The battery cell according to claim 4, wherein:
the battery cell is cylindrical;
the main body portion is circular, and a diameter d of the main body portion satisfies 10 mm≤d≤100 mm; and
an extension dimension D of the folded portion satisfies 0.2 mm≤D≤1 mm.

16. The battery cell according to claim 4, wherein a depth H1 of the recess satisfies 0.1 mm≤H1≤1.8 mm and 0≤|L+D+H−H1−h|<0.2 mm, wherein H is the thickness of the end cap; L is the thickness of the conductive piece, D is the extension dimension of the folded portion, and h is the distance between the step and an outer end surface of the housing, the step being formed on the inner side wall of the housing by the end of the housing close to the end cap that protrudes outwards as a whole.

17. The battery cell according to claim 4, wherein the end cap is circular, and a diameter C1 of the end cap and a width C2 of the bottom wall of the recess satisfy 10 mm≤C1≤100 mm, and 0.2 mm≤C2≤2 mm.

18. The battery cell according to claim 4, wherein:
the end of the housing close to the end cap protrudes outwards as a whole to form a step on an inner side wall of the housing, and the main body portion abuts against the step;
a width W of the step and a distance h between the step and an outer end surface of the housing satisfy 0.2 mm≤W≤1.0 mm and 1 mm≤h≤10 mm.

19. A battery cell, comprising:
a housing, wherein an opening is provided at an end portion of the housing;
an electrode assembly arranged inside the housing, the electrode assembly comprising an electrode body and a first tab, the first tab being leaded from one end of the electrode body;
an end cap closing the opening, the outer periphery of the end cap being fixed to the housing by welding; and
a conductive piece located between the electrode assembly and the end cap, the conductive piece being electrically connected to the first tab, the conductive piece being electrically connected to at least one of the end cap and the housing, and an outer edge of the conductive piece extending at a position close to a welding region;
wherein:
the conductive piece comprises:
a main body portion electrically connected to the first tab; and
a folded portion connected to an edge of the main body portion and extending toward the end cap, the folded portion being a portion of the conductive piece that is closest to the housing;

the end cap comprises a recess at an inner surface of the end cap and arranged close to the edge, the recess being recessed in a direction away from the conductive piece;

the folded portion of the conductive piece extends into the recess of the end cap; and the end cap is in direct contact with an inner surface of the housing, the conductive piece is in direct contact with the inner surface of the housing along a first direction, and the conductive piece is in direct contact with the end cap along a second direction, the first direction being approximately perpendicular to the second direction.

20. A battery cell, comprising:

a housing, wherein an opening is provided at an end portion of the housing;

an electrode assembly arranged inside the housing, the electrode assembly comprising an electrode body and a first tab, the first tab being leaded from one end of the electrode body;

an end cap closing the opening, the outer periphery of the end cap being fixed to the housing by welding; and a conductive piece located between the electrode assembly and the end cap, the conductive piece being electrically connected to the first tab, the conductive piece being electrically connected to the end cap to form a conducting loop by being molten-welded to the end cap using heat from a welding process during which the end cap is welded to the housing, and an outer edge of the conductive piece being welded to the end cap at a welding interface extending at a position close to a welding region at which the end cap is welded to the housing;

wherein:

the conductive piece comprises:

a main body portion electrically connected to the first tab; and a folded portion connected to an edge of the main body portion and extending toward the end cap, the folded portion being a portion of the conductive piece that is closest to the housing;

the end cap comprises a recess at an inner surface of the end cap and arranged close to the edge, the recess being recessed in a direction away from the conductive piece;

the folded portion of the conductive piece extends into the recess of the end cap; and the folded portion is in direct contact with an inner surface of the housing, an edge of a bottom surface of the recess is in direct contact with the inner surface of housing, and the folded portion is in direct contact with the bottom surface of the recess.

* * * * *